(12) United States Patent
Lehenmeier et al.

(10) Patent No.: US 11,401,413 B2
(45) Date of Patent: Aug. 2, 2022

(54) INJECTION-MOLDED ARTICLE CONTAINING SURFACE-MODIFIED SILICATES

(71) Applicant: BASF SE, Ludwigshafen am Rhein (DE)

(72) Inventors: Maximilian Lehenmeier, Ludwigshafen am Rhein (DE); Martin Bussmann, Ludwigshafen am Rhein (DE); Norbert Effen, Ludwigshafen am Rhein (DE); Johannes Klaus Sprafke, Ludwigshafen am Rhein (DE); Gabriel Skupin, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 15 days.

(21) Appl. No.: 16/639,294

(22) PCT Filed: Aug. 9, 2018

(86) PCT No.: PCT/EP2018/071601
§ 371 (c)(1),
(2) Date: Feb. 14, 2020

(87) PCT Pub. No.: WO2019/034515
PCT Pub. Date: Feb. 21, 2019

(65) Prior Publication Data
US 2020/0255655 A1 Aug. 13, 2020

(30) Foreign Application Priority Data

Aug. 15, 2017 (EP) ..................................... 17186283

(51) Int. Cl.
*C08L 67/02* (2006.01)
(52) U.S. Cl.
CPC ......... *C08L 67/02* (2013.01); *C08L 2205/025* (2013.01); *C08L 2205/03* (2013.01)
(58) Field of Classification Search
CPC ..................................................... C08L 67/02
See application file for complete search history.

(56) References Cited

U.S. PATENT DOCUMENTS

| | | | |
|---|---|---|---|
| 5,817,721 A | 10/1998 | Warzelhan et al. | |
| 6,018,004 A | 1/2000 | Warzelhan et al. | |
| 6,046,248 A | 4/2000 | Warzelhan et al. | |
| 6,120,895 A | 9/2000 | Kowitz et al. | |
| 6,258,924 B1 | 7/2001 | Warzelhan et al. | |
| 8,501,845 B2 * | 8/2013 | Scherzer | C08L 67/02 524/114 |
| 8,937,135 B2 | 1/2015 | Steinke et al. | |
| 9,234,073 B2 | 1/2016 | Siegenthaler et al. | |
| 9,914,831 B2 * | 3/2018 | Lehenmeier | B65D 75/36 |
| 2007/0254150 A1 * | 11/2007 | Seino | C08L 67/02 428/339 |
| 2016/0060431 A1 * | 3/2016 | Roth | C08K 5/5313 524/100 |
| 2019/0040216 A1 | 2/2019 | Sprafke et al. | |
| 2019/0269075 A1 | 9/2019 | Minkwitz et al. | |

FOREIGN PATENT DOCUMENTS

| | | |
|---|---|---|
| CN | 1993424 A | 7/2007 |
| CN | 101098934 A | 1/2008 |
| CN | 106661313 A | 5/2017 |
| EP | 488617 A2 | 6/1992 |
| EP | 528078 A1 | 2/1993 |
| EP | 2185682 A1 | 5/2010 |
| JP | 200845117 A | 2/2008 |
| WO | WO-96015173 A1 | 5/1996 |
| WO | WO-96015174 A1 | 5/1996 |
| WO | WO-96015175 A1 | 5/1996 |
| WO | WO-96015176 A1 | 5/1996 |
| WO | WO-97047680 A1 | 12/1997 |

(Continued)

OTHER PUBLICATIONS

European Search Report for EP Patent Application No. 17186283.2, dated Feb. 12, 2018, 3 pages.
US application filed Feb. 14, 2020, U.S. Appl. No. 16/639,313.
International Preliminary Examination Report for PCT/EP2018/071601 date Aug. 27, 2019 with Applicant amendment in response to the IPRP (in German).
International Search Report for PCT/EP2018/071601 dated Sep. 6, 2018.
International Search Report for PCT/EP2018/071607 dated Oct. 17, 2018.

(Continued)

*Primary Examiner* — Michael F Pepitone
(74) *Attorney, Agent, or Firm* — Faegre Drinker Biddle & Reath LLP

(57) ABSTRACT

The present invention relates to an injection molded article comprising:
i) 27% to 87% by weight based on the total weight of the components i to iv of a polyester constructed from aliphatic dicarboxylic acids and aliphatic diols;
ii) 3% to 15% by weight based on the total weight of the components i to iv of an aliphatic-aromatic polyester comprising:
ii-a) 30 to 70 mol % based on the components ii-a to ii-b of a $C_6$-$C_{18}$-dicarboxylic acid;
ii-b) 30 to 70 mol % based on the components ii-a to ii-b of terephthalic acid;
ii-c) 99 to 100 mol % based on the components ii-a to ii-b of 1,3-propanediol or 1,4-butanediol;
ii-d) 0% to 1% by weight based on the components ii-a to ii-c of a chain extender and/or branching agent;
iii) 0% to 35% by weight based on the total weight of the components i to iv of polylactic acid;
iv) 10% to 35% by weight based on the total weight of the components i to iv of at least one surface-modified silicate selected from the group consisting of: kaolin, muscovite, montmorillonite, talc and wollastonite.

8 Claims, No Drawings

(56) References Cited

FOREIGN PATENT DOCUMENTS

| WO | WO-98012242 A1 | 3/1998 | | |
|----|----|----|----|----|
| WO | WO-2009024294 A1 | 2/2009 | | |
| WO | WO-2010034689 A1 | 4/2010 | | |
| WO | WO-2010034711 A1 | 4/2010 | | |
| WO | WO-2015169660 A1 * | 11/2015 | ............. | B65D 75/36 |
| WO | 2018/206352 A1 | 11/2018 | | |
| WO | 2018/210608 A1 | 11/2018 | | |
| WO | 2018/210609 A1 | 11/2018 | | |
| WO | 2019/011643 A1 | 1/2019 | | |

OTHER PUBLICATIONS

Written Opinion of the International Searching Authority for PCT/EP2018/071601 dated Sep. 6, 2018.
Written Opinion of the International Searching Authority for PCT/EP2018/071607 dated Oct. 17, 2018.

* cited by examiner

INJECTION-MOLDED ARTICLE CONTAINING SURFACE-MODIFIED SILICATES

CROSS-REFERENCE TO RELATED APPLICATIONS

This application is a national stage application (under 35 § 371) of PCT/EP2018/071601, filed Aug. 9, 2018, which claims benefit of European Application 17186283.2, filed. Aug. 15, 2017, both of which are incorporated herein by reference in their entirety.

The present invention relates to an injection molded article comprising:
i) 27% to 87% by weight based on the total weight of the components i to iv of a polyester constructed from aliphatic dicarboxylic acids and aliphatic diols;
ii) 3% to 15% by weight based on the total weight of the components i to iv of an aliphatic-aromatic polyester comprising:
   ii-a) 30 to 70 mol % based on the components ii-a to ii-b of a $C_6$-$C_{18}$-dicarboxylic acid;
   ii-b) 30 to 70 mol % based on the components ii-a to ii-b of terephthalic acid;
   ii-c) 99 to 100 mol % based on the components ii-a to ii-b of 1,3-propanediol or 1,4-butanediol;
   ii-d) 0% to 1% by weight based on the components ii-a to ii-c of a chain extender and/or branching agent;
iii) 0% to 35% by weight based on the total weight of the components i to iv of polylactic acid;
iv) 10% to 35% by weight based on the total weight of the components i to iv of at least one surface-modified silicate selected from the group consisting of: kaolin, muscovite, montmorillonite, talc and wollastonite.

WO2015/169660 discloses non-surface-modified talc-containing injection molded articles. These injection molded articles are not completely satisfactory for high mechanical stress applications in terms of their notched impact strength and their elastic modulus.

It is accordingly an object of the present invention to provide injection molded articles which do not have the abovementioned disadvantages. It was a particular object to produce an injection molded article having a high notched impact strength and a high elastic modulus.

Surprisingly, this object was achieved by injection molded articles comprising:
i) 27% to 87% by weight, preferably 40% to 75% by weight, based on the total weight of the components i to iv of a polyester constructed from aliphatic dicarboxylic acids and aliphatic diols;
ii) 3% to 15% by weight, preferably 5% to 10% by weight, based on the total weight of the components i to iv of an aliphatic-aromatic polyester comprising:
   ii-a) 30 to 70 mol % based on the components ii-a to ii-b of a $C_6$-$C_{18}$-dicarboxylic acid;
   ii-b) 30 to 70 mol % based on the components ii-a to ii-b of terephthalic acid;
   ii-c) 98 to 100 mol % based on the components ii-a to ii-b of 1,3-propanediol or 1,4-butanediol;
   ii-d) 0% to 1% by weight based on the components ii-a to ii-c of a chain extender and/or branching agent;
iii) 0% to 35% by weight, preferably 0% to 25% by weight, based on the total weight of the components i to iv of polylactic acid;
iv) 10% to 35% by weight, preferably 15% to 30% by weight, based on the total weight of the components i to iv of at least one surface-modified, in particular silane-modified and especially preferably methacryloylsilane- or vinylsilane-modified, silicate selected from the group consisting of: kaolin, muscovite, montmorillonite, talc and wollastonite, preferably a wollastonite and especially preferably a kaolin.

Especially preferred are injection molded articles comprising:
ii) 27% to 85% by weight, preferably 30% to 65% by weight, based on the total weight of the components i to iv of a biodegradable polyester comprising:
   i-a) 90 to 100 mol % based on components i-a to i-b of succinic acid;
   i-b) 0 to 10 mol % based on components i-a to i-b of one or more $C_6$-$C_{20}$ dicarboxylic acids;
   i-c) 99 to 100 mol % based on the components i-a to i-b of 1,3-propanediol or 1,4-butanediol;
   i-d) 0% to 1% by weight based on the components i-a to i-c of a chain extender and/or branching agent;
ii) 3% to 15% by weight, preferably 5% to 10% by weight, based on the total weight of the components i to iv of an aliphatic-aromatic polyester comprising:
   ii-a) 30 to 70 mol % based on the components ii-a to ii-b of a $C_6$-$C_{18}$-dicarboxylic acid;
   ii-b) 30 to 70 mol % based on the components ii-a to ii-b of terephthalic acid;
   ii-c) 99 to 100 mol % based on the components ii-a to ii-b of 1,3-propanediol or 1,4-butanediol;
   ii-d) 0% to 1% by weight based on the components ii-a to ii-c of a chain extender and/or branching agent;
iii) 0% to 35% by weight, preferably 10% to 30% by weight, based on the total weight of the components i to iv of polylactic acid;
iv) 10% to 35% by weight, preferably 18% to 30% by weight, based on the total weight of the components i to iv of at least one surface-modified, in particular silane-modified and especially preferably methacryloylsilane- or vinylsilane-modified, silicate selected from the group consisting of: kaolin, muscovite, montmorillonite, talc and wollastonite, preferably a wollastonite and especially preferably a kaolin.

The injection molded articles according to the invention exhibit a surprisingly high elastic modulus despite the low polylactic acid content or else despite the complete eschewal of polylactic acid and/or exhibit a good notched impact strength despite the polylactic acid content.

The invention is more particularly described hereinbelow.

Component i is to be understood as meaning polyesters constructed from aliphatic dicarboxylic acid and aliphatic diols.

Suitable dicarboxylic acids include $C_2$-$C_{30}$-diacids or mixtures thereof or aromatic $C_6$-$C_{14}$-diacids or mixtures thereof. The dicarboxylic acids make up generally more than 50, preferably more than 70 mol % and especially preferably more than 99 mol % of the acid repeating units.

Aliphatic $C_2$-$C_{30}$-dicarboxylic acids include for example: oxalic acid, malonic acid, succinic acid, glutaric acid, 2-methylglutaric acid, 3-methylglutaric acid, α-ketoglutaric acid, adipic acid, pimelic acid, azelaic acid, sebacic acid, brassylic acid, fumaric acid, 2,2-dimethylglutaric acid, suberic acid, diglycolic acid, oxalacetic acid, glutamic acid, aspartic acid, itaconic acid and maleic acid.

These dicarboxylic acids or the ester-forming derivatives thereof may be used individually or as a mixture of two or more thereof.

It is preferable to employ succinic acid, adipic acid, azelaic acid, sebacic acid, brassylic acid or their respective ester-forming derivatives or mixtures thereof. It is particularly preferable to employ succinic acid, adipic acid or sebacic acid or their respective ester-forming derivatives or mixtures thereof. Succinic acid, azelaic acid, sebacic acid and brassylic acid additionally have the advantage that they are easily obtainable from renewable raw materials.

Aromatic $C_8$-$C_{14}$-dicarboxylic acids are generally to be understood as meaning naphthalene-1,6-dicarboxylic acid, naphthalene-2,5-dicarboxylic acid, phthalic acid, isophthalic acid and especially preferably terephthalic acid or 2,5-furandicarboxylic acid which is likewise obtainable from renewable raw materials.

Ester-forming derivatives of the aliphatic or aromatic dicarboxylic acids are to be understood as meaning the $C_1$-$C_6$-alkyl esters thereof, wherein the methyl and ethyl esters of the dicarboxylic acids are particularly preferred.

Suitable diols include $C_2$-$C_{18}$-diols such as ethylene glycol, 1,2-propanediol, 1,3-propanediol, 1,2-butanediol, 1,4-butanediol, 1,5-pentanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol and 2,2,4-trimethyl-1,6-hexanediol, wherein ethylene glycol, 1,3-propanediol, 1,4-butanediol and 2,2-dimethyl-1,3-propanediol (neopentyl glycol) are preferred. The latter also have the advantage that they are obtainable as a renewable raw material. Mixtures of different alkanediols may also be employed.

Suitable dials also include cycloaliphatic $C_6$-$C_{18}$-diols such as 1,4-cyclohexanedimethanol (cis/trans), 1,4-di(hydroxymethyl)cyclohexane or 2,5-tetrahydrofurandimethanol, wherein 1,4-cyclohexanedimethanol is preferred.

Aliphatic polyesters i-A are to be understood as meaning polyesters of aliphatic dials and aliphatic dicarboxylic acids such as polybutylene succinate (PBS), polybutylene adipate (PBA), polybutylene succinate-co-adipate (PBSA), polybutylene succinate-co-sebacate (PBSSe), polybutylene sebacate (PBSe) or corresponding polyesteramides or polyesterurethanes. Aliphatic polyesters are marketed, for example, by Showa Highpolymers under the name Bionolle and by Mitsubishi under the name GSPIa. More recent developments are described in WO 2010/034711.

Preference is given to aliphatic polyesters i comprising the following components:
i-a) 90 to 100 mol % based on the components i-a to i-b of succinic acid;
i-b) 0 to 10 mol % based on the components i-a to i-b of one or more $C_6$-$C_{20}$ dicarboxylic acids and in particular adipic acid, azelaic acid, sebacic acid or brassylic acid;
i-c) 99 to 100 mol % based on the components i-a to i-b of 1,3-propanediol or 1,4-butanediol;
i-d) 0% to 1% by weight based on the components i-a to i-c of a chain extender and/or branching agent.

Preferred aliphatic polyesters are polybutylene succinate-co-sebacate (PBSSe), polybutylene succinate-co-adipate (PBSA) and especially preferably polybutylene succinate (PBS).

The polyesters i-a to i-d (A1) generally comprise 0% to 2% by weight, preferably 0.05% to 1.0% by weight and especially preferably 0.1% to 0.3% by weight based on the total weight of the polyester A1 of a branching agent and/or 0.1% to 1.0% based on the total weight of the polyester A1 of a chain extender. The branding agent is preferably at least a trifunctional alcohol or an at least trifunctional carboxylic acid. Contemplated chain extenders include in particular difunctional isocyanates, isocyanurates, oxazolines, carboxylic anhydride or epoxides.

Particularly preferred branching agents have three to six functional groups. Examples include: tartaric acid, citric acid, malic acid; trimethylolpropane, trimethylolethane; pentaerythritol; polyethertriols and glycerol, trimesic acid, trimellitic acid, trimellitic anhydride, pyromellitic acid and pyromellitic dianhydride. Preference is given to polyols such as trimethylolpropane, pentaerythritol and especially glycerol. This component makes it possible to construct biodegradable polyesters having a structural viscosity. Biodegradable polyesters are easier to process.

In the context of the present invention a diisocyanate chain extender is to be understood as meaning especially linear or branched alkylene diisocyanates or cycloalkylene diisocyanates having 2 to 20 carbon atoms, preferably 3 to 12 carbon atoms, for example 1,6-hexamethylene diisocyanate, isophorone diisocyanate or methylenebis(4-isocyanatocyclohexane). Particularly preferred aliphatic diisocyanates are isophorone diisocyanate and in particular 1,6-hexamethylene diisocyanate.

A polyfunctional epoxide chain extender is to be understood as meaning in particular an epoxy-containing copolymer based on styrene, acrylic ester and/or methacrylic ester. The epoxy-bearing units are preferably glycidyl (meth)acrylates. Copolymers having a glycidyl methacrylate proportion of greater than 20%, particularly preferably greater than 30% and especially preferably of greater than 50% by weight of the copolymer have proven advantageous. The epoxy equivalent weight (EEW) in these polymers is preferably 150 to 3000 and especially preferably 200 to 500 g/equivalent. The average molecular weight (weight-average) $M_w$ of the polymers is preferably 2000 to 25000, in particular 3000 to 8000. The average molecular weight (number-average) $M_n$ of the polymers is preferably 400 to 6000, in particular 1000 to 4000. The polydispersity (Q) is generally between 1.5 and 5. Epoxy-containing copolymers of the abovementioned type are for example marketed by BASF Resins B.V. under the Joncryl® ADR brand. A particularly suitable chain extender is Joncryl® ADR 4368 for example.

In general, it is advisable to add the branching (at least trifunctional) compounds at a comparatively early point in the polymerization.

The polyesters i generally have a number-average molecular weight (Mn) in the range from 5000 to 100000, in particular in the range from 10000 to 75000 g/mol, preferably in the range from 15000 to 38000 g/mol, a weight-average molecular weight (Mw) of 30000 to 300000, preferably 60000 to 200000 g/mol, and an Mw/Mn ratio of 1 to 6, preferably 2 to 4. The viscosity number according to ISO 1628-5 (measured in a 0.05 g/ml solution of phenol/o-dichlorobenzene (1:1)) is between 30 and 450, preferably from 100 to 400 ml/g (measured in o-dichlorobenzene/phenol (50/50 weight ratio)). The melting point is in the range from 85° C. to 130° C., preferably in the range from 95° C. to 120° C.

Aliphatic-aromatic polyesters ii are to be understood as meaning linear, chain-extended and optionally branched and chain-extended polyesters, as described for example in WO 96/15173 to 15176 or in WO 98/12242 which are hereby explicitly incorporated by reference. Likewise contemplated are mixtures of different semiaromatic polyesters. Interest in recent developments are based on renewable raw materials (see WO2010/034689). Polyesters ii are in particular to be understood as meaning products such as Ecoflex® (BASF SE).

Preferred polyesters ii include polyesters comprising as essential components;
ii-a) 30 to 70 mol %, preferably 40 to 60 mol % and especially preferably 50 to 60 mol % based on the components ii-a) to ii-b) of an aliphatic dicarboxylic acid or mixtures thereof, preferably: adipic acid, azelaic acid, sebacic acid and brassylic acid, ii-b) 30 to 70 mol %, preferably 40 to 60 mol % and especially preferably 40 to 50 mol % based on the components ii-a) and ii-b) of an aromatic dicarboxylic acid or mixtures thereof, preferably: terephthalic acid, ii-c) 99 to 100 mol % based on the components ii-a) to ii-b) of 1,4-butanediol and 1,3-propanediol; and ii-d) 0% to 1% by weight, preferably 0.1% to 0.2% by weight, based on the components ii-a) to ii-c) of a chain extender, in particular a di- or polyfunctional isocyanate, preferably hexamethylene diisocyanate, and optionally a branching agent, preferably: trimethylolpropane, pentaerythritol and in particular glycerol.

Contemplated aliphatic diacids and corresponding derivatives ii-a are generally those having 6 to 20 carbon atoms, preferably 6 to 10 carbon atoms. They may be either linear or branched. However, it is also possible in principle to employ dicarboxylic acids having a greater number of carbon atoms, for example having up to 30 carbon atoms.

Examples include: 2-methylglutaric acid, 3-methylglutaric acid, α-ketoglutaric acid, adipic acid, pimelic acid, azelaic acid, sebacic acid, brassylic acid, suberic acid and itaconic acid. These dicarboxylic acids or the ester-forming derivatives thereof may be used individually or as a mixture of two or more thereof.

It is preferable to employ adipic acid, azelaic acid, sebacic acid, brassylic acid or their respective ester-forming derivatives or mixtures thereof. It is particularly preferable to employ adipic acid or sebacic acid or their respective ester-forming derivatives or mixtures thereof.

Especially preferred are the following aliphatic-aromatic polyesters: polybutylene adipate terephthalate (PBAT), polybutylene sebacate terephthalate (PBSeT).

The aromatic dicarboxylic acids or the ester-forming derivatives thereof ii-b may be used individually or as a mixture of two or more thereof. Particular preference is given to using terephthalic acid or the ester-forming derivatives thereof such as dimethyl terephthalate.

The diols ii-c—1,4-butanediol and 1,3-propanediol—are obtainable as a renewable raw material. It is also possible to use mixtures of the recited diols.

Generally employed are 0% to 1% by weight, preferably 0.1% to 1.0% by weight and especially preferably 0.1% to 0.3% by weight based on the total weight of the polyester of a branching agent and/or 0.05% to 1% by weight, preferably 0.1% to 1.0% by weight, based on the total weight of the polyester of a chain extender (ii-d). Preference is given to the same branching agents and chain extenders (ii-d) as the branching agents and chain extenders (i-d) described in detail hereinabove.

The polyesters ii generally have a number-average molecular weight (Mn) in the range from 5000 to 100000, in particular in the range from 10000 to 75000 g/mol, preferably in the range from 15000 to 38000 g/mol, a weight-average molecular weight (Mw) of 30000 to 300000, preferably 60000 to 200000 g/mol, and an Mw/Mn ratio of 1 to 6, preferably 2 to 4. The viscosity number is between 50 and 450, preferably from 80 to 250 g/ml (measured in o-dichlorobenzene/phenol (50/50 weight ratio)). The melting point is in the range from 85° C. to 150° C., preferably in the range from 95° C. to 140° C.

The MVR (melt volume flow rate) according to EN ISO 1133-1 DE (190° C., 2.16 kg weight) is generally 5 to 50 $cm^3$/10 min, preferably 7.5 to 25 $cm^3$/10 min. The acid numbers according to DIN EN 12634 are generally 0.01 to 1.2 mg KOH/g, preferably 0.01 to 1.0 mg KOH/g and especially preferably 0.01 to 0.7 mg KOH/g.

The stiff component iii employed is polylactic acid (PLA). It is preferable to employ polylactic acid having the following profile of properties:

a melt volume flow rate (MVR at 190° C. and 2.16 kg according to ISO 1133-1 DE in particular from 30 to 40 $cm^3$/10 minutes)

a melting point below 240° C.;

a glass transition temperature (Tg) greater than 55° C.

a water content of less than 1000 ppm a residual monomer content (lactide) of less than 0.3% a molecular weight of greater than 80 000 Dalton.

Preferred polylactic acids are for example NatureWorks® 6201 D, 6202 D, 6251 D, 3051 D and especially 3251 D and also crystalline polylactic acid types from NatureWorks.

As mentioned hereinabove the polylactic acid iii is employed for the aromatic polyesters i-B in a weight percent fraction based on the components i and iv, of 0% to 35%, preferably of 0% to 10%. For the aliphatic polyesters i-A the polylactic acid is employed in a weight percent fraction based on the components i and v, of 0% to 35%, preferably of 10% to 30%. It is preferable here when the polylactic acid iii forms the disperse phase and the polyester i forms the continuous phase or is part of a co-continuous phase. Polymer mixtures comprising polyester i in the continuous phase or as part of a co-continuous phase have a higher heat distortion temperature than polymer mixtures in which polylactic acid iii forms the continuous phase.

As mentioned hereinabove the injection molded articles according to the invention exhibit a surprisingly high elastic modulus despite the low polylactic acid content or else despite the complete eschewal of polylactic acid.

Generally employed are 10% to 35% by weight, in particular 20% to 30% by weight, based on the total weight of the components i to iv of at least surface-modified, in particular silane-modified and especially preferably methacryloylsilane- or vinylsilane-modified, silicate selected from the group consisting of: kaolin, muscovite, montmorillonite, talc and wollastonite, preferably a wollastonite and especially preferably a kaolin iv.

The surface modification of the silicate plays a decisive role. Preferably employed for surface modification are silanes. Especially preferred are silane-modified silicates, particularly preferably silicates modified with hydroxysilane, aminosilane, epoxysilane, alkylsilane, mercaptosilane, ureidosilane, halosilane or especially preferably with methacryloylsilane or vinylsilane. Surface-modified silicates are marketed for example by Imery, BASF, Amberger Kaolinwerke and in particular by the Hoffmann group. In the present injection molded articles outstanding mechanical properties have been achieved in particular by silane-modified wollastonites from Amberger Kaolinwerke, marketed under the brand name Tremin®; silane-modified kaolins from BASF, marketed under the brand name Translink® and in particular silane-modified kaolins from the Hoffmann group, marketed under the name aktifit. Especially for the aliphatic polyesters i-A aminosilane-modified silicates are preferred and methacryloylsilane- or vinyl silane-modified silicates are particularly preferred since these fillers provide injection molded articles having a high elastic modulus coupled with a high notched impact strength.

In addition to the surface modification, the particle size and aspect ratio (L/D or cross sectional ratio) play a large role.

A small particle size generally results in high notched impact strengths but a relatively low elastic modulus. It is preferable to employ a fine silicate having a proportion of 50% of particles ($D_{50}$ particle size measured according to ISO 13320-1) below 5 µm, preferably below 2 µm. The proportion of particles below 16 µm, preferably below 10 µm, may be increased to 97% by sieving.

An aspect ratio of 1 to 15 and preferably 2 to 10 and especially preferably of 2 to 6 has proven advantageous. The average aspect ratio may be determined by conductivity measurement as described in EP 528078 B1.

The silicate employed is preferably surface-modified kaolin or wollastonite and especially preferably surface-modified kaolin. Kaolin is a natural product and comprises not only the main constituent kaolinite—a hydrated aluminum silicate—but also other clay minerals and non-decomposed feldspar particles.

A preferred kaolin source is Neuburg siliceous earth, a mixture of corpuscular silica and lamellar kaolinite. The silica here has a round grain shape composed of aggregated primary particles of about 200 nm in size.

Preferably employed is fine kaolin having a sphere-equivalent statistical average particle diameter of 0.3 to 1.5 µm; especially preferably from 0.3 to 1.0 µm and a proportion of 50% of particles below 2 µm. The proportion of particles below 10 µm may be increased to 97% by sieving.

The oil absorption, a measure of relative surface area, is 23 g/100 g for a coarse kaolin, 45 g/100 g for a fine kaolin and 55 g/100 g for a calcined kaolin.

Calcined kaolin is particularly preferred because of the elevated specific surface area. The water of crystallization of the kaolin fraction is driven out by calcination. In the case of Neuburg siliceous earth the cryptocrystalline silica fraction remains inert during the calcination.

The injection molded articles according to the invention may further comprise 0% to 15% by weight based on the polymer mixture i to iv of other mineral fillers selected from the group consisting of: chalk, graphite, gypsum, conductive carbon black, iron oxide, calcium chloride, sodium carbonate, titanium dioxide and mineral fibers. Fillers from renewable raw materials such as starch, non-thermoplasticized and in particular plasticized starch, cellulose, chitin or chitosan may be present in the injection molded articles according to the invention in amounts of 0% to 10% by weight based on the polymer mixture i to iv.

The inventive compound of the components i to iv may also comprise further additives known to those skilled in the art. Examples include the additives customary in the plastics industry such as stabilizers; nucleating agents such as the abovementioned mineral fillers iv or else crystalline polylactic acid; lubricants and release agents such as stearates (especially calcium stearate); plasticizers, for example citric esters (especially acetyl tributyl citrate), glyceryl esters such as triacetylglycerol or ethylene glycol derivatives, surfactants such as polysorbates, palmitates or laurates; waxes, for example erucamide, stearamide or behenamide, beeswax or beeswax esters; antistats, UV absorbers; UV stabilizers; antifogging agents or dyes. The additives are used in concentrations of 0% to 2% by weight, in particular 0.1% to 2% by weight, based on the inventive compound i to iv. Plasticizers may be present in the inventive compound i to iv in amounts of 0.1% to 10% by weight.

In order to obtain the injection molded articles with particularly high notched impact strengths it is possible to add in addition to the inventive surface-modified kaolin either a thermoplastic polyurethane (also referred to hereinbelow as TPU) or a thermoplastic copolyester (also referred to hereinbelow as TPEE).

Thermoplastic polyurethanes are well known. Production is carried out by reaction of (a) isocyanates (hard phase) with (b) isocyanate-reactive compounds/polyol having a number-average molecular weight of $0.5 \times 10^3$ g/mol to $5 \times 10^3$ g/mol (soft phase) and optionally (c) chain extenders having molecular weight of $0.05 \times 10^3$ g/mol to $0.499 \times 10^3$ g/mol optionally in the presence of (d) catalysts and/or (e) customary auxiliaries and/or additives.

The isocyanate-reactive compound (b) has on statistical average at least 1.8 and at most 3.0 Zerewittinoff-active hydrogen atoms, this number also being referred to as the functionality of the isocyanate-reactive compound (b) and indicating the amount of isocyanate-reactive groups in the molecule theoretically calculated for one molecule from an amount of substance. The functionality is preferably between 1.8 and 2.6, more preferably between 1.9 and 2.2 and in particular 2.

Examples of TPUs particularly preferred for the injection molded articles according to the invention include those obtainable from BASF Polyurethane GmbH under the brand name Elastollan® such as for example: 685A, S80A, SP 806, 1085A, 785A, 595A, 1598 A, 1295 A, N65A or C85A.

Examples of TPEEs particularly preferred for the injection molded articles according to the invention include the products marketed under the brand names Hytrel®, Arnitel®, Riteflex®, Pebax® or Pelprene®.

Biodegradability generally results in the polyester (mixtures) decomposing in an appropriate and verifiable timeframe. The degradation may be effected enzymatically, hydrolytically, oxidatively and/or by the action of electromagnetic radiation, for example UV radiation, and may usually be brought about predominantly by the action of microorganisms such as bacteria, yeasts, fungi and algae. Biodegradability may be quantified for example when polyester is mixed with compost and stored for a certain time. For example according to DIN EN 13432 (which refers to ISO 14855) CO2-free air is passed through matured compost during composting and said compost is subjected to a defined temperature program. Biodegradability is here defined via the ratio of the net CO2 release from the sample (after subtracting the CO2 release by the compost without a sample) to the maximum CO2 release from the sample (calculated from the carbon content of the sample) as a percentage degree of biodegradation. Biodegradable polyester (mixtures) generally show distinct signs of degradation such as fungus growth and tear and hole formation even after just a few days of composting.

Other methods for determining biodegradability are described in ASTM D 5338 and ASTM D 6400-4.

Injection molding is a molding process which is very often used in plastics processing. Injection molding makes it possible to produce immediately usable moldings in large numbers of pieces in highly economic fashion. In simple terms, the process operates as follows: in an injection molding machine which consists of a heatable barrel in which a screw rotates, the respective thermoplastic material ("molding material") is melted and injected into a mold made of metal. The cavity of the mold determines the shape and the surface structure of the finished molding. Moldings in the weight range from markedly less than 1 g up to double-digit kilogram weights are possible today.

Injection molding makes it possible to produce consumer goods economically and in a short time with high precision. The nature of the surface of the respective component is virtually freely choosable by the manufacturer. From smooth surfaces for optical applications via grains for tactile regions through to patterns or engravings, a multiplicity of surface structure is achievable.

For economic reasons the injection molding process is particularly suitable for the production of relatively large numbers of pieces such as packaging articles.

Articles such as trays for chocolates, trays for board game boxes, clamshells for all sorts of small articles in suspension wall displays for retail sales and yogurt or margarine pots are widely used. Preferred articles are lids for coffee cups or other cups for hot beverages and containers for filling with hot foodstuffs.

A particularly preferred injection molded article is a coffee capsule. A coffee capsule is to be understood as meaning a container having a fill volume of 1 ml to 80 ml, preferably 3 to 50 ml. This container is filled with a pulverulent foodstuff, in particular coffee powder, or a mixture of pulverulent foodstuffs. Foodstuff is to be understood as meaning not only coffee but also tea, milk, cocoa and soup extracts. The shape of the container may be rotationally symmetrical, conical, spherical or else angular, but preferably rotationally symmetrical and largely cylindrical. This container is used for storage of the foodstuff(s) and also for preparation of an aqueous hot beverage produced in a subsequent step by passage of hot water (between 60° C. and 100° C.) through the container. The water passing through dissolves flavor and bitterness chemicals during passage through the container and thus forms the hot beverage.

This container shall be manufactured by injection molding. The flat film used therefor from which the container(s) is (are) produced has a wall thickness of 100 to 1000 μm, preferably 250 to 800 μm, and in particular 155 to 550 μm. The article may consist of one layer and preferably of a plurality of layers. At least one layer comprises the compound of components i) to iv) described hereinabove. A further layer of the ready-molded container preferably forms a barrier-forming layer. The multilayer construction may be produced by multilayer extrusion during flat film production or else after flat film production applied as a layer by extrusion, printing, spray application or sputtering, in principle by application of a dispersion, a lacquer or a further polymer-based or polymer-comprising system or application of a metallic or oxide-containing layer but preferably by means of a polymer-based or metallized layer. A suitable metallized layer is for example aluminum and suitable polymer-based layers include layers comprising polyglycolic acid (PGA), polyhydroxyalkanoates (PHA) such as for example poly-3-hydroxybutyrate (PHB), poly-3-hydroxybutyrate-co-3-hydroxyvalerate (PHB(V)), poly-3-hydroxybutyrate-co-3-hydroxyhexanoate (PHB(H)) or poly-3-hydroxybutyrate-co-4-hydroxyvalerate; polyvinyl alcohol (PVOH), polyvinylidene chloride (PVDC) or ethylene vinyl alcohol (EVOH). This barrier layer is characterized by an oxygen transmission rate (OTR) measured over the entire film composite after container production according to ASTM D1434 of 0 to 1000 g/m$^2$/d, a water vapor transmission rate according to ASTM F1249 of 0 to 1000 g/m$^2$/d and preferably a simultaneous aroma barrier.

The good oxygen barrier/aroma barrier may also be achieved by means of an outer packaging for one or more coffee capsules. Suitable outer packagings may be plastics films or paper films coated with a barrier film.

Suitable for the injection molding process are in particular compounds of the components i to iv having an MVR (190° C., 2.16 kg), according to ISO 1133-1 of Jan. 3, 2012, of 8 to 40 cm$^3$/10 min, especially preferably 9 to 30 cm$^3$/10 min.

Performance Testing:

The molecular weights Mn and Mw of the semiaromatic polyesters were determined by SEC according to DIN 55672-1. Eluent: hexafluoroisopropanol (HFIP)+0.05% by weight potassium trifluoroacetate; calibration performed with narrow-distribution polymethyl methacrylate standards.

Viscosity numbers were determined according to DIN 53728 Part 3, Jan. 3, 1985, capillary viscometry. An Ubbelohde M-II microviscometer was used. The solvent used was the mixture: phenol/o-dichlorobenzene in a weight ratio of 50/50.

The elastic modulus was determined according to ISO 527-3: 2003 by a tensile test using tensile bars having a thickness of about 420 μm.

The Charpy notched impact strength was determined according to DIN EN 179-1/1 eU:2000+Amd.A (measured at 23° C., 50% rel. h.). The test specimen (80 mm×10 mm×4 mm) mounted close to its ends as a horizontal bar and is subjected to a single impact of a pendulum, wherein the impact line is located centrally between the two test specimen mounts and (the test specimen) is bent at a high, nominally constant, speed (2.9 or 3.8 m/s).

The heat distortion temperature HDT-B was determined according to DIN EN ISO 75-2:2004-9. A standard test specimen is subjected to a three-point bending under constant load to generate a flexural stress (HDT/B 0.45 MPa) specified in the relevant part of this international standard.

The temperature is increased at a uniform rate (120 K/h) and the temperature at which a predetermined standard flexing, which corresponds to the predetermined flexural strain (0.2%), is achieved is measured.

Starting Materials

Polyester i;

i-1 Polybutylene succinate: GS-Pla® FZ71-PD from Mitsubishi Chemical Corporation (MVR of 22 cm$^3$/10 min (190° C., 2.16 kg))

Polyester ii:

ii-1 Polybutylene adipate-co-terepthalate: Ecoflex® FS A1300 from BASF SE (MVR of 8.5 cm$^3$/10 min (190° C., 2.16 kg)

Component iii-1 Polylactic acid (PLA) Ingeo 3251 D from NatureWorks (MVR of 35 cm$^3$/10 min (190° C., 2.16 kg))

Component iv:

iv-1 Santintone SHB; non-surface-modified kaolin from BASF Corporation iv-2 Tremin 283 600 MST, Amberger Kaolinwerke, methacryloylsilane-modified wollastonite iv-3 Translink 555 from BASF Corporation, aminosilane-modified kaolin having an average particle diameter of 0.8 μm iv-4 Aktifit AM from Hoffmann Group, aminosilane-modified kaolin iv-5 Aktifit VM from Hoffmann Group, vinylsilane-modified kaolin 1. Compounding The compounds shown in table 1 were manufactured in a Coperion MC 40 extruder. The outlet temperatures were set to 250° C. The extrudate was subsequently granulated underwater. After granulate production the granulate was dried under vacuum at 60° C.

2, Production of the articles (general procedure GP)

The compounded material is performed on a Ferromatik Millacron K65 injection molding machine having a 30.00 mm screw. The injection mold was a single- or multi-cavity mold having an open hot runner. Articles were manufactured using ISO 179/1 eU: and ISO 527-1/-2: CAMPUS molds. The mold temperature was 30° C. and the molds were filled with a pressure of 560 bar and a hold pressure of 800 bar.

TABLE 1

| | Example | | | | | | | |
|---|---|---|---|---|---|---|---|---|
| | V1 | V2 | 3 | 4 | 5 | 6 | 7 | 8 |
| Compounds (amounts in percent by weight) | | | | | | | | |
| i-1 | 76 | 80 | 76 | 72 | 68 | 65 | 62.22 | 62.22 |
| ii-1 | 4 | | 4 | 8 | 12 | 15 | 7.78 | 7.78 |
| iv-1 | 20 | | | | | | | |
| iv-2 | | | | | | 20 | | |
| iv-3 | | 20 | 20 | 20 | 20 | | | |
| iv-4 | | | | | | | 30 | |
| iv-5 | | | | | | | | 30 |
| ISO bar thickness (mm) | 3.92 | 3.92 | 3.92 | 3.93 | 3.94 | 3.98 | 3.95 | 3.95 |
| Elastic modulus (MPa) | 1098 | 1229 | 1058 | 938 | 904 | 682 | 1108 | 1079 |
| Charpy (kJ/m$^2$) | 6.18 | 6.9 | 7.16 | 7.81 | 9.13 | 7.55 | 8.17 | 8.51 |
| HDT/B (° C.) | 89.8 | 93.7 | 89.8 | 90.0 | 88.3 | 84.5 | 89.7 | 90.0 |

TABLE 2

| Polylactic acid-containing injection molded articles | | | | | | |
|---|---|---|---|---|---|---|
| | Example | | | | | |
| | 9 | 10 | 11 | 12 | 13 | 14 |
| Compounds (amounts in percent by weight) | | | | | | |
| i-1 | 55 | 48.89 | 42.78 | 55 | 48.89 | 42.78 |
| ii-1 | 10 | 8.88 | 7.78 | 10 | 8.88 | 7.78 |
| iii-1 | 25 | 22.23 | 19.44 | 25 | 22.23 | 19.44 |
| iv-1 | | | | | | |
| iv-2 | | | | | | |
| iv-3 | 10 | 20 | 30 | | | |
| iv-4 | | | | | | |
| iv-5 | | | | 10 | 20 | 30 |
| ISO bar thickness (mm) | 3.93 | 3.93 | 3.92 | 3.93 | 3.93 | 3.93 |
| Elastic modulus (MPa) | 1401 | 1701 | 2172 | 1368 | 1559 | 1893 |
| Charpy (kJ/m$^2$) | 10.90 | 9.91 | 7.83 | 11.1 | 11.8 | 10.3 |

The invention claimed is:

1. An injection molded article comprising:
   i) 27% to 87% by weight based on the total weight of the components i to iv of a polyester constructed from aliphatic dicarboxylic acids and aliphatic diols;
   ii) 3% to 15% by weight based on the total weight of the components i to iv of an aliphatic-aromatic polyester comprising:
      ii-a) 30 to 70 mol % based on the components ii-a to ii-b of a $C_6$-$C_{18}$-dicarboxylic acid;
      ii-b) 30 to 70 mol % based on the components ii-a to ii-b of terephthalic acid;
      ii-c) 99 to 100 mol % based on the components ii-a to ii-b of 1,3-propanediol or 1,4-butanediol;
      ii-d) 0% to 1% by weight based on the components ii-a to ii-c of a chain extender and/or branching agent;
   iii) 0% to 35% by weight based on the total weight of the components i to iv of polylactic acid;
   iv) 10% to 35% by weight based on the total weight of the components i to iv of at least one surface-modified kaolin;
   wherein the kaolin has a vinylsilane-modified surface.

2. The injection molded article according to claim 1, wherein polyester i is a biodegradable aliphatic polyester comprising:
   i-a) 90 to 100 mol % based on components i-a to i-b of succinic acid;
   i-b) 0 to 10 mol % based on components i-a to i-b of one or more $C_6$-$C_{18}$-dicarboxylic acids;
   i-c) 99 to 100 mol % based on the components i-a to i-b of 1,3-propanediol or 1,4-butanediol;
   i-d) 0% to 1% by weight based on the components i-a to i-c of a chain extender and/or branching agent.

3. The injection molded article according to claim 1, wherein the surface-modified kaolin has an aspect ratio of 1 to 15.

4. The injection molded article according to claim 2, comprising 10% to 30% by weight based on the total weight of the components i to iv of polylactic acid.

5. The injection molded article according to claim 1, comprising 0% by weight based on the total weight of the components i to iv of polylactic acid.

6. The injection molded article according to claim 1, comprising 0.5% to 10% by weight based on the total weight of the components i to iv of a thermoplastic polyurethane.

7. The injection molded article according to claim 1 having a notched impact strength according to DIN EN 179-1/1eU:2000 of greater than 8 kJ/m$^2$.

8. The injection molded article according to claim 1 having an elastic modulus according to ISO 527-3:2003 of greater than 1500 MPa.

\* \* \* \* \*